March 24, 1964     C. E. SCHUTTE     3,125,778

ADJUSTABLE WINDSHIELD WIPER

Filed Jan. 7, 1963     2 Sheets-Sheet 1

INVENTOR.
CHARLES E. SCHUTTE
BY J.R. Faulkner
Stuart Lubitz
ATTORNEYS

March 24, 1964     C. E. SCHUTTE     3,125,778
ADJUSTABLE WINDSHIELD WIPER
Filed Jan. 7, 1963     2 Sheets-Sheet 2
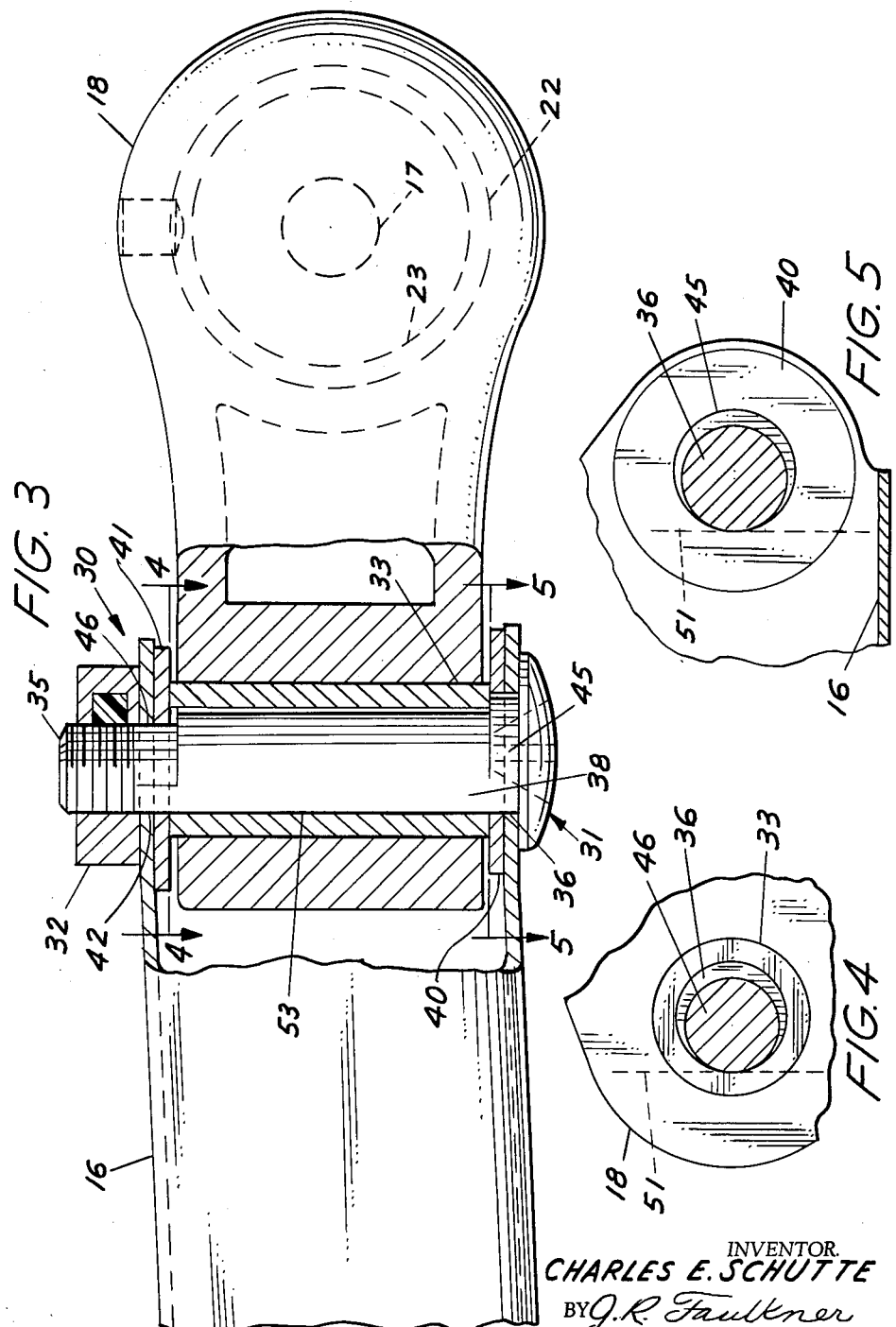
INVENTOR.
CHARLES E. SCHUTTE
BY J. R. Faulkner
Stuart Lubitz
ATTORNEYS

United States Patent Office 3,125,778
Patented Mar. 24, 1964

3,125,778
ADJUSTABLE WINDSHIELD WIPER
Charles E. Schutte, Pigeon, Mich., assignor to Ford Motor Company, Dearborn, Mich., a corporation of Delaware
Filed Jan. 7, 1963, Ser. No. 249,881
7 Claims. (Cl. 15—250.35)

This invention pertains to windshield wipers. More particularly this invention pertains to an improved means for attaching a wiper arm to the pivot shaft of a windshield wiper at any selected angle.

Present windshield wiper arm to shaft attachments employ a shaft having a straight knurled head or spindle and a wiper arm having a head section with a complementary internally knurled socket. While this type of wiper arm to shaft attachment has been generally satisfactory, it has the disadvantage that the arm can only be angularly adjusted relative to the shaft in increments determined by the angular spacing between the complementary knurls. As a practical matter it has been found that the smallest angular space between the complementary straight knurls is approximately 4½° due to the fact that the diameter of the mating parts must necessarily be rather small. This angular adjustment limitation may cause the windshield wiper blade to be out of alignment with the weatherstrip that runs along the cowl of the windshield of the automotive vehicle.

The object of the present invention is to provide a windshield wiper arm to shaft attachment means that permits adjustment of the arm to any angle desired. This object is accomplished by utilizing the standard knurled socket and knurled head arrangement and modifying the connection between the head section and the wiper arm so that rotating the connection will provide an angular adjustment from zero to five degrees. This zero to five degrees adjustment cooperates with the four and one-half degrees incremental adjustment permitted by the knurled arrangement and enables the wiper arm to be adjusted to any desired angle. The modification of the connection means involves the placing of properly proportioned eccentric or cam members on the bolt which forms part of the connection means for connecting the wiper arm to the head section.

Other objects and the specific construction of the invention will be understood when the specification is read in conjunction with the drawings wherein:

FIGURE 3 is a fragmentary top view taken along the line 3—3 of FIGURE 2;

FIGURE 4 is a sectional view taken along the line 4—4 of FIGURE 3; and

FIGURE 5 is a sectional view taken along the line 5—5 of FIGURE 3.

Figure 1:
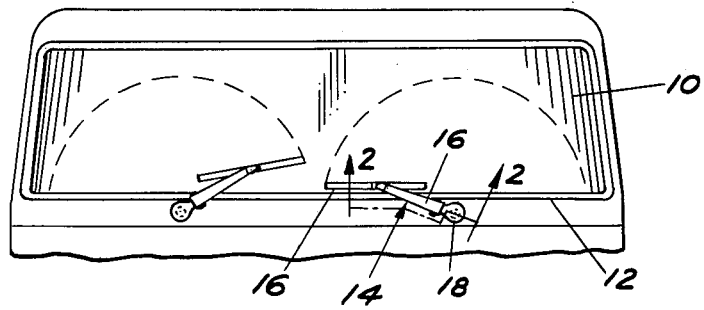
FIGURE 1 is a fragmentary view of a portion of a vehicle having a wiper arm with the improved attachment means.

Referring to FIGURE 1 a portion of a vehicle is shown including the windshield 10 having a lower molding or weatherstrip 12 and an oscillatory wiper blade and arm assembly comprising an arm 14 and a blade 15. In accordance with conventional practice the wiper arm 14 includes spring hinge connected inner section 16 and outer or head section 18. The wiper blade 15 carried by the wiper arm 14 is designed for oscillatory movement across the outer surface of windshield 10. When the wiper motor is deenergized the wiper blade is designed to assume a park position firmly engaging the molding or weatherstrip 12 so as to be out of the driver's range of vision. In order to accurately determine this park position, the head section 18 is connected to its pivot shaft by an attachment means that permits infinite angular adjustment.

Figure 2:
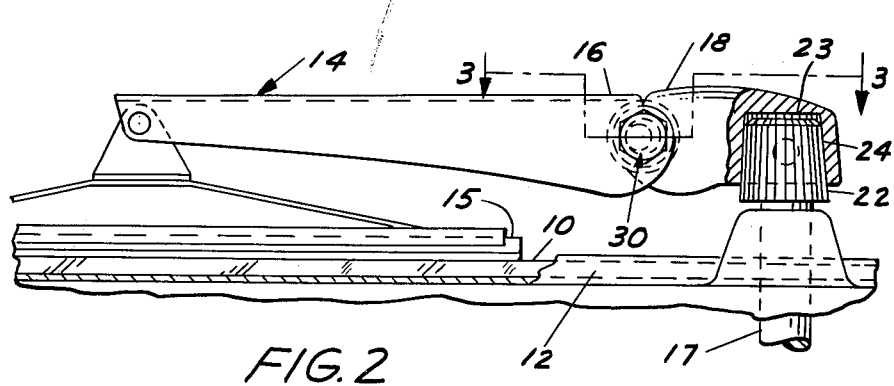
FIGURE 2 is a fragmentary elevation of the wiper arm and head section joined by the improved attachment means.

Referring to FIGURES 2 to 4, the head section 18 of the wiper arm 14 is drivingly connected to a pivot shaft 17 having a knurled head or spindle 22 attached to its outer end. The knurls on the head 22 are designed to mesh with the knurls 23 in the socket 24 of the head section 18. These knurls are commonly spaced at four and one-half degree intervals. At one end of the head section 18 the attachment means or connection means 30 joins the head section 18 to the inner section 16. The attachment means 30 is the most important part of the instant invention and is shown in detail in FIGURES 3–5.

Referring to FIGURES 3–5, the attachment means 30 comprises a rivet or bolt member 31, a lock nut 32 which threadedly engages the bolt member 31 and a bushing 33. The bolt member 31 includes a head portion 34, a threaded portion 35 and body or shaft 36. The shaft 36 passes through an aperture or hole 38 in the inner section 18, a washer 40, the bushing 33 placed in the head section 16, the washer 41 and the aperture 42 in the inner section 18. Two eccentrics or cams 45 and 46, which cooperate with the apertures 38 and 42 respectively, are formed on the shaft 36. The relationship of the eccentrics 45 and 46 and the center portion of the shaft 36 is clearly shown in FIGURES 4 and 5. In referring to FIGURES 4 and 5 it should be noted that the eccentrics 45 and 46 and the center portion of the shaft 36 have a common tangent along the broken line 51 in FIGURES 4 and 5 and line 52 in FIGURE 3.

To adjust the windshield wiper arm 18 to any desired angle the head section 18 is first located on the straight knurls of the head 22 so that the wiper arm 14 is located as close as possible to the weatherstrip 12. The attachment means 30 is then rotated in a clockwise or counterclockwise direction, as required, and the eccentrics 45 and 46 cooperate with the apertures 38 and 42 in the wiper arm 14 to rotate the wiper arm through a maximum angle of five degrees. The range of angularity which the attachment means provides may be modified in accordance with the specific design requirements. Once the wiper is properly aligned the lock nut 38 is tightened to permanently secure the wiper arm 14 to the head section 18.

From the above detailed description it is apparent that a simple modification to the existing windshield wiper structure has been made which provides the surprising result of a wiper arm which may be assembled at any desired angle. This selectability of the assembly angle improves the appearance of the windshield wiper blade when assembled, improves the wiper pattern as it moves over the windshield and improves visibility.

It will be understood that the invention is not to be limited to the exact construction shown and described, but that various changes and modifications may be made without departing from the spirit and scope of the invention, as defined in the appended claims.

I claim:
1. In a windshield wiper organization, the combination comprising a pivot shaft having a knurled surface, a head section having a knurled surface which mates with said knurled surface on said pivot shaft, a windshield wiper arm, and a connection means for connecting said windshield wiper arm to said head section, said connection means having an eccentric means thereon for rotating said wiper arm to a desired angle when said connection means is rotated.

2. In a windshield wiper organization, the combination comprising a pivot shaft having a knurled surface, a head section having a knurled surface which mates with said knurled surface on said pivot shaft, a windshield wiper arm, and a connection means for connecting said windshield wiper arm to said head section, said connection means having an eccentric means thereon for moving said wiper arm to a desired angle relative to said head section when said connection means is rotated.

3. In a windshield wiper organization, the combination comprising a pivot shaft, a socket section which fits on said pivot shaft, a windshield wiper arm and an attachment means for attaching said windshield wiper arm to said socket section, said attachment means adapted to be rotated and having a cam means thereon for moving said wiper arm to a desired angle when rotated.

4. In a windshield wiper organization, the combination comprising a pivot shaft, a socket section which fits on said pivot shaft, a windshield wiper arm and an attachment means for attaching said windshield wiper arm to said socket section, said attachment means adapted to be rotated and having a cam means thereon for moving said wiper arm a desired angle relative to said socket section when rotated.

5. In a windshield wiper organization, the combination comprising a pivot shaft, a socket section which is adapted to fit on said pivot shaft, a windshield wiper arm and an attachment means for connecting said windshield wiper arm to said socket section at any desired angle, said attachment means comprising a knurled surface on said pivot shaft, a knurled surface on said socket section and a bolt member having cam means thereon which cooperate with said wiper arm.

6. In a windshield wiper organization, the combination comprising a pivot shaft having a knurled surface, a socket section having a knurled surface which mates with said knurled surface on said pivot shaft, said socket section having a plurality of apertures, a windshield wiper arm having a plurality of apertures and a bolt member adapted to fit in said apertures in said windshield wiper arm and said socket section and having eccentrics thereon which cooperate with the apertures in said windshield wiper arm to move said wiper arm relative to said socket section.

7. In a windshield wiper organization, the combination comprising a pivot shaft having a knurled surface, a socket section having a knurled surface which mates with said knurled surface on said pivot shaft, said socket section having a plurality of apertures, a windshield wiper arm having a plurality of apertures and a bolt member adapted to fit in said apertures in said windshield wiper arm and said socket section and having eccentrics thereon which cooperate with said apertures to move said wiper arm relative to said socket section.

References Cited in the file of this patent
UNITED STATES PATENTS
3,009,186    Lenz _____ Nov. 21, 1961